United States Patent [19]

Ricci

[11] Patent Number: 4,962,854

[45] Date of Patent: Oct. 16, 1990

[54] VIDEOCASSETTE CASE

[76] Inventor: Geoge M. Ricci, 1402 187th Ave. NE., Bellevue, Wash. 98008

[21] Appl. No.: 341,153

[22] Filed: Apr. 20, 1989

[51] Int. Cl.$^5$ .......................................... B65D 85/672
[52] U.S. Cl. ...................................... 206/387; 206/518; 220/72
[58] Field of Search ............. 206/387, 45.34, 518–520; 220/339, 72; 229/2.5 R

[56] References Cited

U.S. PATENT DOCUMENTS

| | | |
|---|---|---|
| D. 221,409 | 8/1971 | Gerber . |
| D. 224,177 | 7/1972 | Wallace . |
| 3,420,402 | 1/1969 | Frater et al. ............. 206/520 X |
| 3,551,940 | 1/1971 | Edison ..................... 220/339 X |
| 3,620,411 | 11/1971 | Rump . |
| 3,710,975 | 1/1973 | Jansen ..................... 220/339 |
| 3,737,067 | 6/1973 | Palson . |
| 3,851,789 | 12/1974 | Case et al. . |
| 4,013,214 | 3/1977 | Hensen et al. ............ 206/45.39 X |
| 4,102,452 | 7/1978 | Sato et al. ................ 206/387 |
| 4,127,189 | 11/1978 | Shumrak et al. . |
| 4,153,178 | 5/1979 | Weavers . |
| 4,184,594 | 1/1980 | Hehn . |
| 4,230,225 | 10/1980 | Okada et al. ............. 206/387 |
| 4,231,474 | 11/1980 | Tahahashi et al. ....... 206/387 |
| 4,235,334 | 11/1980 | Ahn ........................... 206/387 |
| 4,322,000 | 3/1982 | Struble ..................... 206/387 |
| 4,363,403 | 12/1982 | Raucci, Jr. et al. ...... 206/387 |
| 4,407,410 | 10/1983 | Graetz et al. . |
| 4,432,827 | 2/1984 | Graetz et al. . |
| 4,558,782 | 12/1985 | Iverson et al. ........... 206/387 |
| 4,590,090 | 9/1985 | Gelardi et al. ........... 206/387 |
| 4,593,814 | 6/1986 | Hagiwara et al. ....... 206/387 |
| 4,681,223 | 7/1987 | Roberts .................... 220/339 X |
| 4,703,853 | 11/1987 | Byrns . |
| 4,753,366 | 6/1988 | Ritter . |

FOREIGN PATENT DOCUMENTS

| | | | |
|---|---|---|---|
| 2513333 | 10/1976 | Fed. Rep. of Germany ...... 206/387 |
| 3222333 | 12/1983 | Fed. Rep. of Germany ...... 206/387 |
| 2477104 | 9/1981 | France ................... 206/387 |
| 2478361 | 9/1981 | France ................... 206/387 |

OTHER PUBLICATIONS

BonFaire 2225 container.

Primary Examiner—Bryon P. Gehman
Attorney, Agent, or Firm—Hughes & Multer

[57] ABSTRACT

A videocassette case which has traylike upper and lower sections connected by a living hinge along one side of the case, components at the opposite sides thereof and integral with the upper and lower case sections for latching them together, bosses extending upwardly from the bottom wall of the lower case section which engage the hubs of a cassette stored in the case to keep them from rotating and allowing the tape to be creased, unitary stiffeners in the side and end walls of the case sections which also serve as spacers and snugly position the cassette in the case, and external legs in the end walls of the upper and lower case sections which facilitate stacking and also increase the rigidity of the upper and lower case sections. At least the upper section of the case is fabricated from a polymer which is clear enough to make labels and other data associated with the stored cassette visible from the exterior of the case.

10 Claims, 4 Drawing Sheets

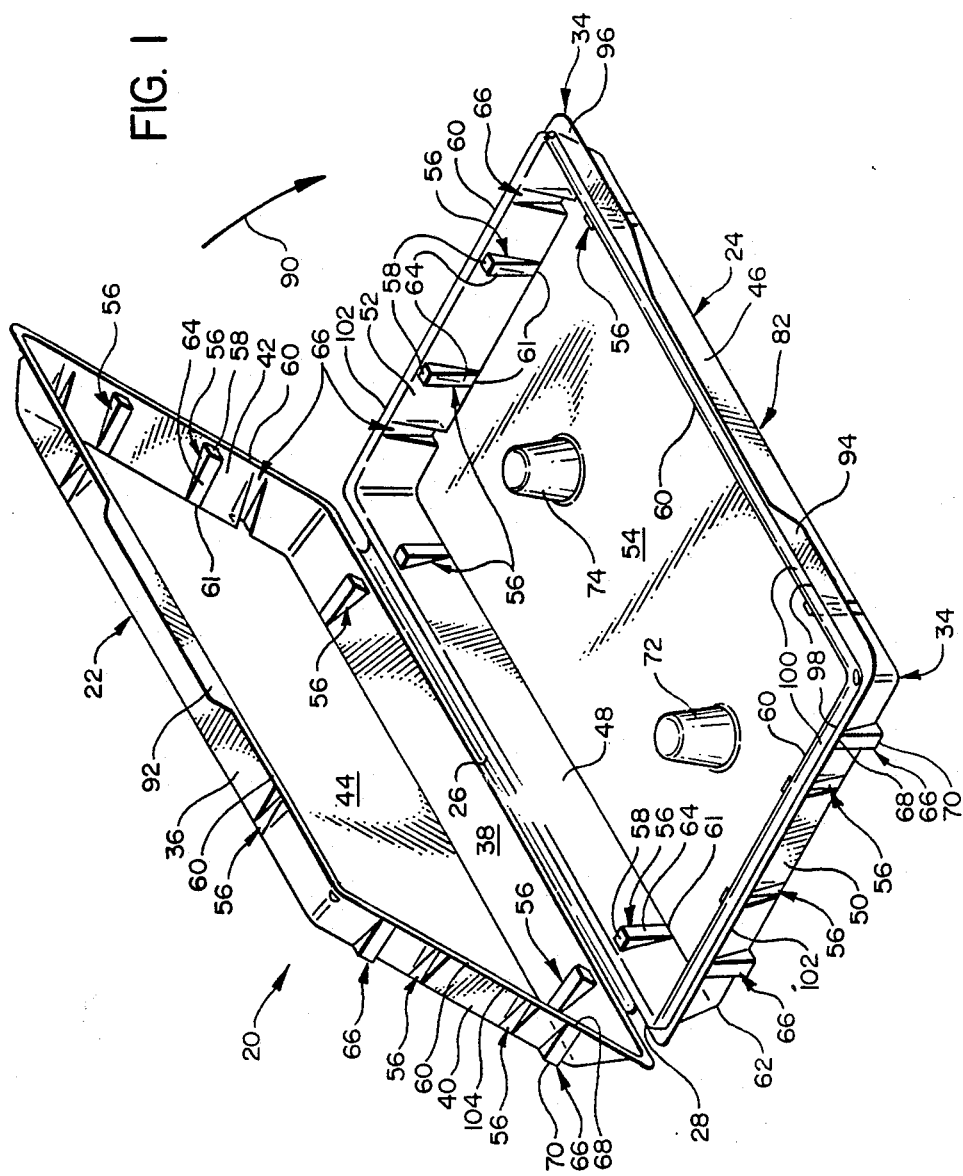

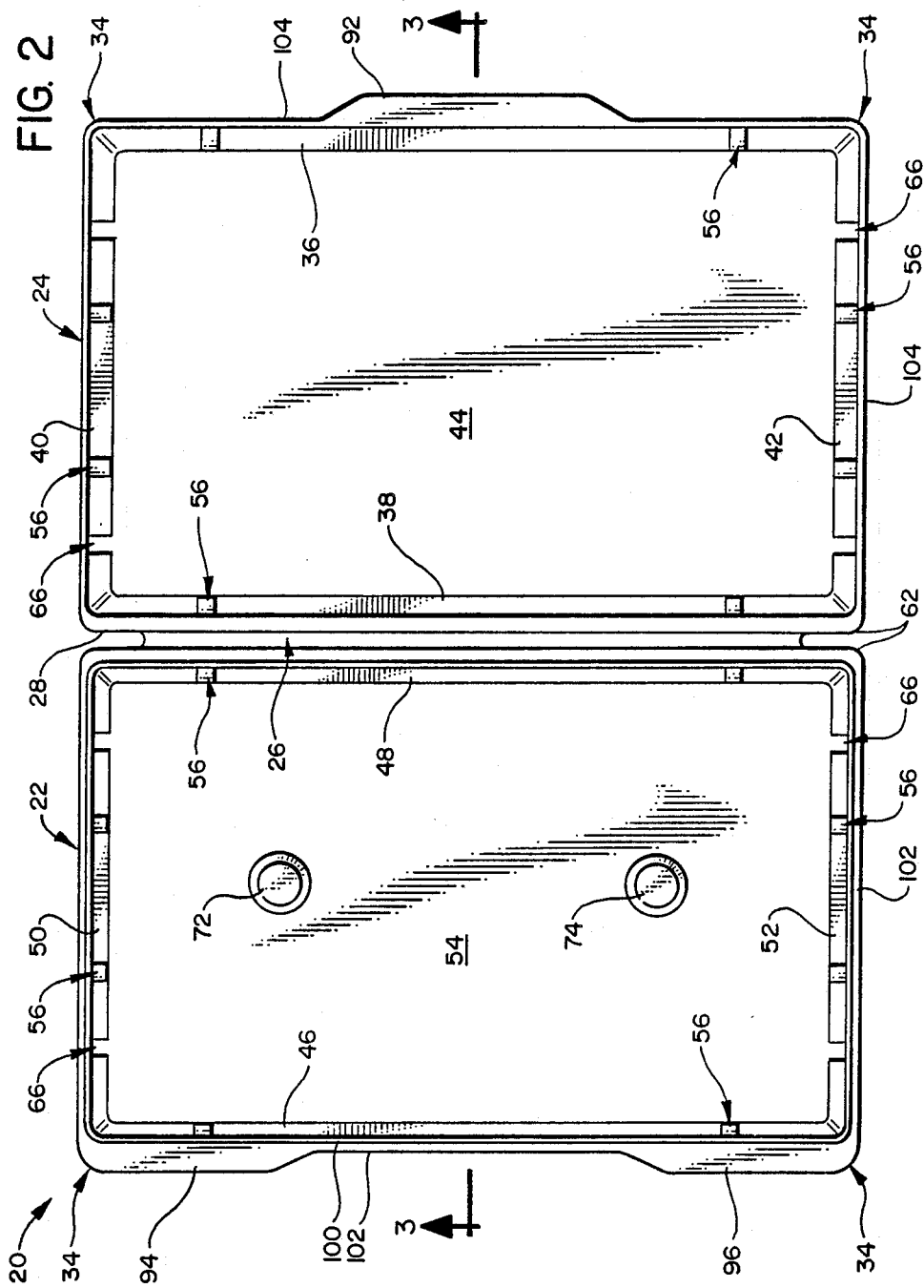

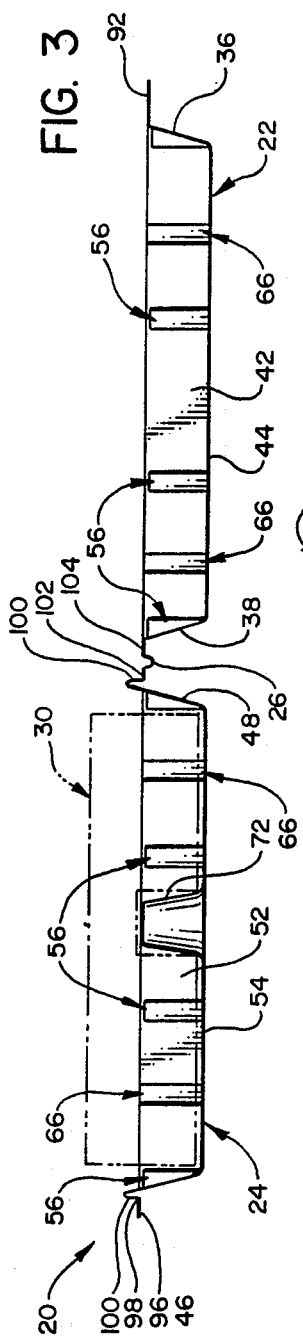
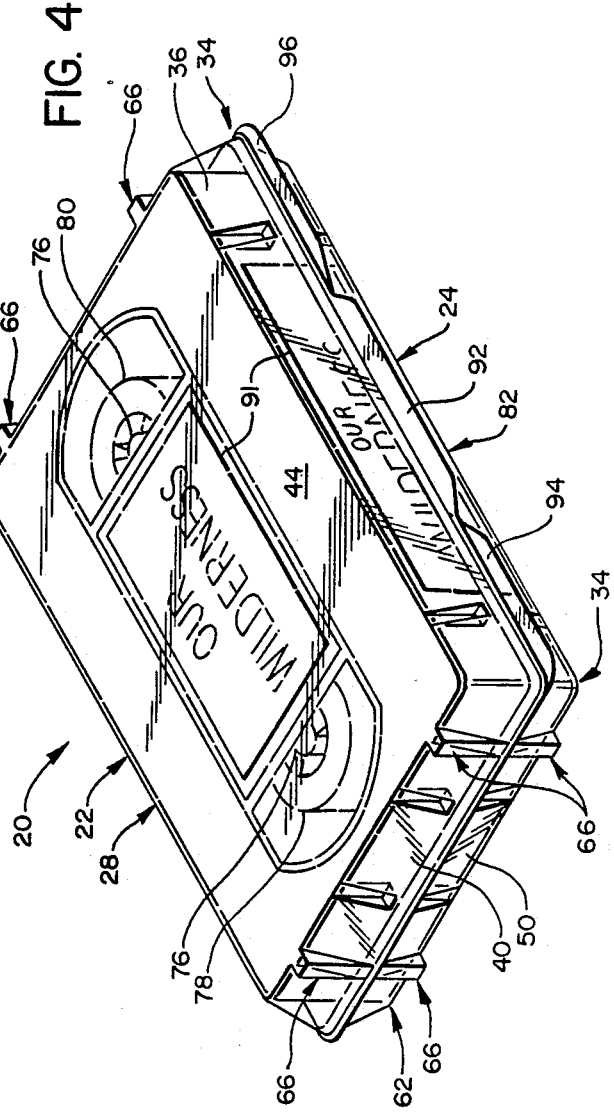

VIDEOCASSETTE CASE

TECHNICAL FIELD OF THE INVENTION

The present invention relates to novel, improved cases for videocassettes.

BACKGROUND OF THE INVENTION

Two types of videocassette cases or holders are currently employed. Neither is particularly satisfactory.

One of these presently available videocassette cases is the ubiquitous book type. Although videocassette cases of this type have been thermoformed, they are most often manufactured from a hard, opague, synthetic polymer (typically a polypropylene) by injection molding. This type of videocassette case has the disadvantage of being too expensive to be practical in many instances. In addition, it commonly has the drawback that the case must be opened if one wishes to review the information on the label commonly attached to the cassette, especially if the cassette has been prerecorded. Furthermore, it is difficult to form a stable stack of book-type videocassette cases for transport or storage.

Sleeve-type, plastic and cardboard videocassette holders lack durability. In addition, cardboard sleeves rapidly become shopworn and are easily stained and otherwise soiled, which is of course a significant disadvantage, particularly in applications such as videocassette rentals, for example. In addition, both plastic and cardboard, sleeve-type videocassette holders have the disadvantage that the cassette must be removed from the sleeve to review the information on a videocassette label. And, like book-type videocassette cases, both plastic and cardboard sleeves have the disadvantage that they cannot be conveniently stacked in a stable manner for transport and storage. Furthermore, the encased cassette is not protected from dust or other foreign matter.

SUMMARY OF THE INVENTION

There have now been invented, and disclosed herein, certain new and novel videocassette cases which are free of the above-discussed and enumerated drawbacks and disadvantages of currently available videocassette cases or holders. These novel cases are preferably fabricated from a transparent (or at least substantially transparent), thermoformable polymer such as a biaxially oriented polystyrene in a single step as by vacuum forming. The use of a polymer of the foregoing character and vacuum forming make the novel videocassette cases disclosed herein much cheaper to manufacture than conventional book-type cases. Furthermore, the transparency of the polymers from which the herein disclosed videocassette cases are made allows one to review information on an encased videocassette without having to open the case or remove the videocassette from it. At the same time, the materials from which the herein disclosed videocassette cases are fabricated makes them much more durable than currently available sleeve-type containers, particularly those fabricated from cardboard. And, unlike the latter, the videocassette cases disclosed herein are not easily soiled or stained; and such foreign substances as might adhere to them can be easily removed with a damp cloth.

The novel videocassette cases disclosed herein have traylike, upper and bottom sections connected by a unitary living hinge extending along one edge of the case. Unitary ribs or stiffeners formed in and from the side and end walls of the upper and lower casing sections lend rigidity to the case and increase its durability. Two truncated, conical bosses formed in and from the bottom wall of the lower case section frictionally engage the hubs of an encased videocassette and keep the hubs of the cassette from rotating. This is important in that, if a hub does rotate, slack may appear in the cassette's tape and result in the tape being damaged, if not rendered totally unusable, by creasing.

Another salient feature of the novel videocassette cases disclosed herein are legs formed in and from the end walls of the upper and lower case sections at the corners of the case. These extend to the top and bottom of the case and allow one case to easily be stacked on another in a stable manner for transport and storage.

OBJECTS OF THE INVENTION

From the foregoing, it will be apparent to the reader that the primary object of the present invention resides in the provision of novel, improved cases for videocassettes.

Other also important but more specific objects of the invention reside in the provision of videocassette cases as described in the preceding object which are significantly less expensive to produce than the currently available, book-type, molded plastic, videocassette cases;

which are significantly more durable than conventional, cardboard cassette cases or holders;

which have the advantage over conventional, sleeve-type, plastic and cardboard cassette holders that the hubs of the stored tape are kept from turning and thereby allowing the tape of an encased cassette to be creased;

which make information on the cassette and the position (rewound or not) and length of the tape visible from the exterior of the container;

which can be easily and quickly stacked in a stable manner for storage and shipping;

which are resistant to soiling and staining and can easily be cleaned if they do become soiled; and which do not allow dust or other foreign matter to penetrate to the interior of the case.

Other important objects and features and additional advantages of the invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. 1 is a pictorial view of an open videocassette case embodying the principles of the present invention;

FIG. 2 is a plan view of the open case;

FIG. 3 is a section taken substantially along line 3—3 of FIG. 2 and showing a videocassette in a lower, traylike section of the case;

FIG. 4 is a pictorial view of the closed case and the encased videocassette.

DETAILED DESCRIPTION OF THE INVENTION

Figure 5:
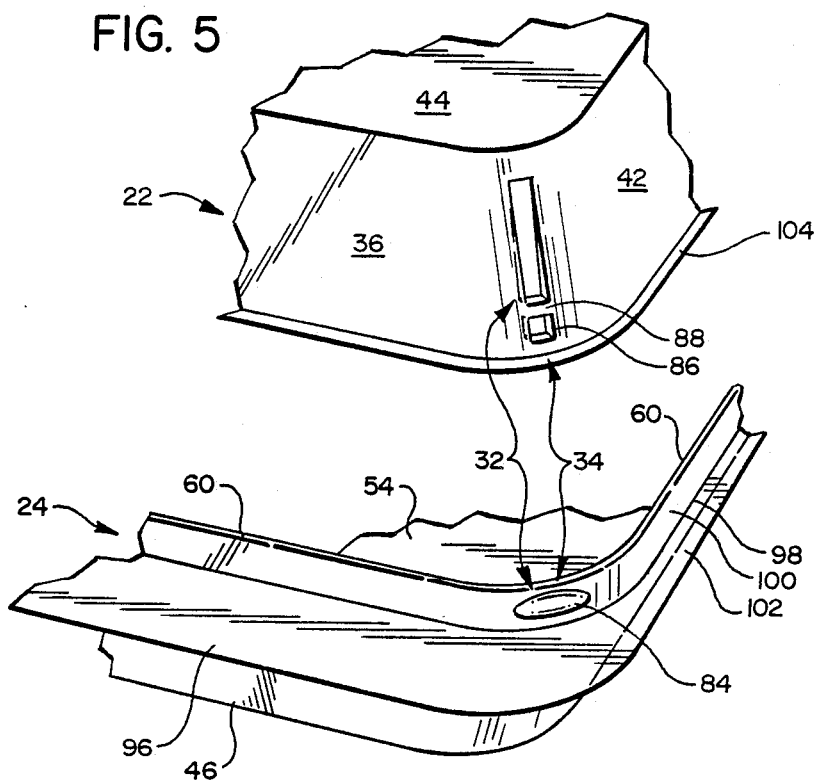
FIG. 5 is a detail drawing of a mechanism for latching an upper section of the case to its lower section.

Referring now to the drawing, the figures thereof depict a videocassette case or holder 20 constructed in accord with, and embodying, the principles of the present invention.

The major components of case 20 include an upper, traylike section 22; a lower, also traylike section 24; and an integral, living hinge 26. This hinge extends along the rear edge 28 of container 20 and connects upper case section 22 to lower case section 24 for pivotable movement between: (a) the open position shown in FIG. 1, which allows a videocassette 30 (see FIG. 3) to be loaded in to the lower tray 24 of case 20 and removed from the case; and (b) the closed position shown in FIG. 4 in which cassette 30 is protectively encased in and surrounded by case 20.

In the closed configuration illustrated in FIG. 4, upper case section 22 is latched to lower case section 24 by two, identical latch mechanisms 32 (see FIG. 5). One of these is located at each of the two front corners 34 of case 20.

It will be readily apparent to those conversant with the arts involved that the illustrated and just described videocassette case 20 can be inexpensively manufactured in one piece and in one step, employing only a single vacuum mold.

As is perhaps best shown in FIGS. 1 and 4, the upper section 22 of videocassette case 20 has depending front and rear side walls 36 and 38 and depending end walls 40 and 42, all integral with a flat top wall 44. The lower case section 24 is of similar configuration, including as it does upwardly extending, unitary, front and rear and 48 and a flat bottom wall 54.

Unitary hollow stiffeners 56 which double in function as spacers and also provide the draft needed for successful vacuum forming of videocassette case 20 are formed in and along the side and end walls 36...42 of upper case section 22 and the front, rear, and side walls 46...52 of lower case section 24 on the inside of each case section 22 and 24. These stiffeners 56 are hollow and have a rectangular cross section and a wedge-shaped profile. The base 58 of the stiffener lies adjacent the free edge 60 of the wall 36...42 or 46...52 in which the particular stiffener is formed, and the apex 61 of the stiffener is located at that edge of the wall adjacent upper section top wall 22 or lower section top wall 24. In the illustrated embodiment of the invention, two ribs or stiffeners 56 of the character just described are formed in each of the depending and vertically extending side and end walls 36...42 and 46...52 of the upper and lower case sections 22 and 24. The stiffeners 56 are spaced at a significant, although not critical, distance from the front corners 34 and rear corners 62 of case 20.

With a videocassette 30 installed in case 20 and the upper section 22 latched to the lower section 24 as shown in FIG. 4, the front and rear edges and the ends of the cassette engage the inner, vertically extending and depending edges 64 of these stiffeners with the case sections being laterally and longitudinally dimensioned to furnish a relatively snug fit between stiffeners/spacers 56 and the cassette to keep the latter from moving around in the case.

To make it easy to stack one case 20 upon another in a stable manner, two integral legs 66 are formed in and from and on the exterior side of each end wall 40 and 42 of upper case section 22 and in and from, and also on the exterior side of, each lower casing section end wall 50 and 52. The two legs 66 in each case end wall embrace the set of stiffener/spacers 56 in the same end wall and lie nearer the front and rear corners 34 and 62 of case 20 than the latter. Like stiffeners/spacers 56, integrally formed legs 66 are hollow and have a rectangular cross-section and a triangular or wedge shaped profile. The apex 68 of each leg 66 is at, or adjacent, the free edge 60 of the end wall 40, 42, 50, or 52 from which it is formed. Each leg 66 extends to the top wall 44 of upper case section 22 or the bottom wall 54 of lower case section 24 and terminates in a base 70.

The legs 66 formed from upper case section end walls 40 and 42 and the legs 66 formed from lower case section end walls 50 and 52 are vertically aligned as shown in FIG. 4. Consequently, the bases 70 of the legs 66 of one case 20 can rest upon the bases 70 of the legs 66 of a case 20 therebeneath, stabilizing in a quite satisfactory manner even a relatively tall stack of cases.

Referring now most specifically to FIGS. 1 and 2, two similarly dimensioned, vertically oriented and extending hollow bosses 72 and 74, each with the configuration of a truncated cone, are formed in and from the bottom wall 54 of lower case section 24. These bosses extend into the central apertures 76 in the hubs 78 and 80 of a videocassette 30 stored in case 20 (see FIG. 4) and keep hubs 78 and 80 from rotating. As discussed above, this is important in that the tape (not shown) in the videocassette 30 is thereby kept from becoming slack and thus potentially damaged or rendered unusable by creasing.

With a videocassette 30 installed and the case 20 closed as shown in FIG. 4, upper case section 22 is latched to lower case section 24 at the front side 82 of case 20 by the two latch mechanisms 32 mentioned briefly above and best illustrated in FIG. 5. Each of these two, essentially identical, latch mechanisms 32 includes a dimple 84 formed in lower case section 24 toward the upper edge of that section and at a front corner 34 of case 20. Cooperating with the just-described dimple 84 of each latch mechanism 32 and formed in upper case section 22 at the same corner 34 and on the inside of case section 22 are a vertically aligned detent 86 and stop 88. As upper case section 22 is moved from the open position shown in FIG. 1 to the closed position illustrated in FIG. 4 in the direction indicated by arrow 90 in FIG. 1, detent 86 snaps into the dimple 84 on the outside of lower case section 24 to latch upper case section 22 to lower case section 24. Stop 88 rests on the upper or free edge 60 of lower casing front wall 46 to keep detent 86 from being displaced in the direction of arrow 90 past dimple 84.

As was discussed above and is readily apparent from FIG. 4, the novel, herein disclosed concept of making a videocassette from an at least partially, if not completely, transparent material has the decided advantage that information on the labels commonly provided on the top and front edge of a thus encased videocassette (collectively identified by reference characters 91) can easily be read or reviewed without the bother of opening the videocassette case.

In addition to the features and components discussed above, container 20 will typically have horizontally extending, integral tabs 92, 94, and 96 which one can employ, if desired, for assistance in opening container 20. Tab 92 extends horizontally from and is centrally located with respect to the free edge 60 of the front wall 36 of upper casing section 22. Cooperating tabs 94 and 96 are located at the opposite ends of the front wall 46 of lower casing section 24 and at the bottom edge 98 of a depending, integral flange 100 which runs around the periphery of lower casing section 24 at the upper edge thereof. With videocassette case 20 in the closed configuration shown in FIG. 4, the outer side of this flange 100 is engaged by the inner sides of depending front, rear, and end walls 36-42 of upper casing section 22. This provides a dustproof seal between upper and lower case sections 22 and 24 and also stiffens and makes substantially more rigid the upper section 22 of the casing.

As is shown in FIGS. 1-4, a second, horizontally extending, integral flange 102 surrounds lower case section 24 toward the upper edge thereof and at the lower edge of depending flange 100. A cooperating, also integral and horizontally extending, flange 104 surrounds upper casing section 22 at the lower edge of that casing. With videocassette case 20 in the closed configuration shown in FIG. 4, upper case section flange 104 rests on lower case section flange 102 to position the upper casing section in the wanted, vertical relationship to the lower casing section.

The invention maY be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A videocassette case fabricated in its entirety and as a single component from a non-rigid, thin gauge synthetic polymer and having a traylike upper section and a traylike lower section; each of said sections having first and second side walls and first and second end walls; said lower section having a flat bottom wall; said upper section having a flat upper wall; said upper and lower sections being dimensioned to confine a videocassette between the apposite side and end walls of said upper and lower sections; there being a unitary living hinge extending along and between a said side wall of said upper section and a said side wall of said lower section, cooperating means on the other side wall of said upper section and the other side wall of said lower section which can be engaged to latch said upper and lower sections together, and hollow, frustoconical bosses which are formed unitarily with and extend upwardly from said bottom wall of said lower section so as to have open lower ends at said bottom wall and which are engageable with the hubs of a videocassette stored in said case to prevent said hubs from rotating; and at least said upper section being sufficiently transparent to permit information on a cassette stored therein to be viewed through said upper section.

2. A videocassette case as defined in claim 1 which is formed with a plurality of hollow stiffeners formed unitarily with, and at spaced intervals along, said side and end walls of said upper and lower sections of said case.

3. A videocassette case as defined in claim 2 in which said hollow stiffeners along said side and end walls of said lower section of said case each have a rectangular section and a wedge-shaped profile with the apex at the bottom of said lower section, and said hollow stiffeners along said side and end walls of said upper section of said case each have a rectangular section and a wedge-shaped profile with the apex at the top of the upper section, and the base of each said stiffener is adjacent the free edge of the side or end wall in which it is formed.

4. A videocassette case as defined in claim 2 in which said stiffeners are dimensioned to engage the sides and ends of a videocassette stored in said case and thereby restrain said videocassette against longitudinal and lateral movements in said case.

5. A videocassette case as defined in claim 1 which has a plurality of hollow legs formed unitarily with, and at spaced intervals along, each said end wall of said upper and lower sections of said case and on the outer side of said case, said legs associated with said upper and lower sections of said case being vertically aligned and respectively extending to said top wall of said upper section and to said bottom wall of said lower section and thereby facilitating the stacking of plural ones of said case.

6. A videocassette case as defined in claim 5 in which each of said legs has a rectangular section and a wedge-shaped profile with the base of each of said legs at the bottom of said lower section or the top of said upper section in which it is formed to thereby provide a case-to-case contact between adjacent cases in a stack thereof which will stabilize said stack.

7. A videocassette case as defined in claim 5 which has a plurality of hollow stiffeners formed unitarily with, and at spaced intervals along, said side and end walls of said upper and lower sections of said case and protruding into said case, there being two of said legs formed unitarily with each of said end walls of said upper and lower sections of said case, said legs being located toward the corners of said case, and those stiffeners in each of said end walls being located between said two legs formed unitarily with each of said end walls.

8. A videocassette case as defined in claim 7 in which each of said legs and stiffeners has a rectangular section and a wedge-shaped profile with the apex of each stiffener at said bottom wall of said lower section or said top wall of said upper section and the base of each said leg at said bottom wall or at said top wall.

9. A videocassette case fabricated in its entirety and as a single component from a non-rigid, thin gauge synthetic polymer and having a traylike upper section and a traylike lower section; each said section having first and second side walls and first and second end walls; said lower section having a flat bottom wall; said upper section having a flat upper wall; said upper and lower sections being dimensioned to confine a videocassette between the apposite side and end walls of said upper and lower sections; there being a unitary living hinge extending along and between a said side wall of said upper section and a said side wall of said lower section, cooperating means on the other side wall of said upper seciton and the other side wall of said lower section which can be engaged to latch said upper and lower sections together, a plurality of stiffeners formed unitarily with, and at spaced intervals along, said side and end walls of said lower section and protruding into said case so as to form hollows on the exterior of said lower section of said case, each said stiffener on said lower section having a rectangular section and a wedge-shaped profile with an apex at said bottom wall of said lower section and a base adjacent to the free edge of the side or end wall in which it is formed, a plurality of stiffeners formed unitarily with, and at spaced intervals along, said side and end walls of said upper section and protruding into said case so as to form hollows on the exterior of said upper section of said case, each said stiffener on said upper section having a rectangular section and a wedge-shaped profile with an apex at said upper wall of said upper section and a base adjacent to the free edge of the side or end wall in which it is formed, thereby facilitating stacking of plural ones of said case, each said case being stacked in an open position so that said upper wall and lower wall thereof are substantially horizontal, and so that said inwardly protruding stiffeners on a said upper section of a first said case are received in said hollows on the exterior of a said upper section of a second said case and said upper wall of said first case is adjacent said upper wall of said second case, and said inwardly protruding stiffeners on a said lower section of said first case are received in said hollows on the exterior of a said lower section of said second case and said bottom wall of said first case is adjacent said bottom wall of said second case; said stiffeners in said lower an upper sections of said case being dimensioned to fit snugly against the sides and ends of a videocassette stored in said case and thereby restrain said videocassette against longitudinal and lateral movements in said case.

10. A videocassette case as defined in claim 9 which has a plurality of hollow legs formed unitarily with and at spaced intervals along, said end walls of said lower section of said case and protruding outwardly therefrom so as to form hollows on the interior of said lower section of said case, each said leg on said lower section having a rectangular section and a wedge-shaped profile with an apex adjacent the free edge of the end wall in which it is formed and a base at said bottom wall of said lower section; and a plurality of legs formed unitarily with, and at spaced intervals along, said end walls of said upper section and protruding outwardly from said case so as to form hollows on the interior of said upper section of said case, each said leg on said upper section having a rectangular section and a wedge-shaped profile with an apex adjacent to the free edge of the side or end wall in which it is formed and a base at said upper wall of said upper section, so that when said first and second cases are stacked, said outwardly protruding legs on said upper section of said second case are received within said hollows on said interior of said upper section of said first case, and said outwardly protruding legs on said lower section of said second case are received within said hollows on said interior of lower section of said first case.

* * * * *

UNITED STATES PATENT AND TRADEMARK OFFICE
CERTIFICATE OF CORRECTION

PATENT NO. : 4,962,854

DATED : October 16, 1990

INVENTOR(S) : George M. Ricci

It is certified that error appears in the above—identified patent and that said Letters Patent is hereby corrected as shown below:

On the title page, Item (76), Inventor:

"Geogre" should read --George--.

In the Specification:

Column 3, line 29, after "rear" insert --walls 46--.

Column 5, line 18, "maY" should read --may--.

Column 6, line 53, "seciton" should read --section--.

Column 7, line 17, "an" should read --and--.

Signed and Sealed this

Seventh Day of January, 1992

Attest:

HARRY F. MANBECK, JR.

Attesting Officer

Commissioner of Patents and Trademarks